US007016694B2

(12) United States Patent
Lee

(10) Patent No.: US 7,016,694 B2
(45) Date of Patent: Mar. 21, 2006

(54) METHOD FOR CORRECTING POSITIONING ERRORS OF MOBILE STATION POSITIONING SYSTEM IN CDMA COMMUNICATION SYSTEM

(75) Inventor: Sang Uk Lee, Kyunggi-Do (KR)

(73) Assignee: MSP Technology, Inc., Seoul (KR)

( * ) Notice: Subject to any disclaimer, the term of this patent is extended or adjusted under 35 U.S.C. 154(b) by 190 days.

(21) Appl. No.: 10/767,071

(22) Filed: Jan. 30, 2004

(65) Prior Publication Data

US 2004/0266459 A1 Dec. 30, 2004

(30) Foreign Application Priority Data

Jun. 25, 2003 (JP) ...................... 10-2003-0041693

(51) Int. Cl.
*H04Q 7/20* (2006.01)

(52) U.S. Cl. ............................... 455/456.6; 455/456.1; 455/456.2; 455/456.5; 370/335; 370/342

(58) Field of Classification Search .. 455/456.5–456.6, 455/456.1, 456.2
See application file for complete search history.

(56) References Cited

U.S. PATENT DOCUMENTS 6,832,090 B1 * 12/2004 Riley et al. ................. 455/446
2004/0110514 A1 * 6/2004 Kim et al. ............... 455/456.1

* cited by examiner

*Primary Examiner*—Joseph Feild
*Assistant Examiner*—Wayne Cai
(74) *Attorney, Agent, or Firm*—Antonelli, Terry, Stout and Kraus, LLP.

(57) ABSTRACT

Disclosed is a method for correcting positioning errors of a mobile station positioning system in a CDMA mobile communication system. The method includes the steps of: delaying a PN code for a +64Chip period or a +64Chip+nChip period in a +64Chip delay element or a +64Chip+nChip delay element; combining the PN code transmitted to the MS with a PN code created by delaying the transmitted PN code for the +64Chip period or the +64Chip+nChip period in a combiner; in the MS, receiving the PN code of the specific BTS and the PN code created by delaying the PN code of the specific BTS; in a position determination entity (PDE) of the mobile station positioning system, analyzing the PN codes received from a mobile positioning center (MPC) to the MS, thereby determining whether the PN code of the specific BTS is transmitted to the MS via the repeater; and if it is determined that the PN code is transmitted, subtracting a delayed time value due to a corresponding repeater itself, thereby calculating a distance between the specific BTS and the MS in the PDE.

6 Claims, 8 Drawing Sheets

METHOD FOR CORRECTING POSITIONING ERRORS OF MOBILE STATION POSITIONING SYSTEM IN CDMA COMMUNICATION SYSTEM

This application claims the benefit of the Korean Application No. Patent Application No. 2003-41693 filed on Jun. 25, 2003 which is hereby incorporated by reference.

BACKGROUND OF THE INVENTION

1. Field of the Invention

The present invention relates to a mobile station positioning system for positioning a mobile station (MS) connected to a code division multiple access (CDMA) mobile communication network, and more particularly, to a method for correcting positioning errors of the mobile station positioning system in the CDMA communication system, which is capable of correcting the positioning errors due to a delayed time generated when a PN code of a base station transceiver subsystem (BTS) is received in the MS via a repeater as one of information used for positioning the MS in the position determination entity (PDE).

2. Discussion of the Related Art

FIG. 1 illustrates a construction of a conventional mobile station positioning system 30.

Referring to FIG. 1, the mobile station positioning system 30 serves as an application server managed by a mobile communication manager or a contents provider of providing a positioning information service. The mobile station positioning system 30 includes a location service center (LSC) 31, a mobile station positioning center (MPC) 32, a position determination entity (PDE) 33, and a database (DB) 34.

If the LSC 31 requests a present positioning information of a specific mobile station (MS) 10 so as to provide a service based thereon, the MPC 32 receives the positioning information of the MS 10 from a mobile communication network 20 and transmits the received positioning information to the PDE 33.

At this time, the positioning information includes a pseudo random noise (PN) code of a plurality of base station transceiver subsystems (BTSs), a reception sensitivity (Ec/Io), a relative propagation delay time between the BTSs based on the PN code, a system identification code (SID), a switching identification code (NID) and a BTS identification code (BID), etc.

Further, the positioning information of the MS 10 is transmitted to the MPC 32 via a sequence of the BTS 21 belonging to a cell of the MS 10, a base station controller (BSC) 22 and a mobile switching controller (MSC) 23.

The PDE 33 receives the positioning information of the MS 10 from the MPC 32, thereby positioning the MS 10 in such a general manner of a time deference of arrival (TDOA).

The general TDOA manner is performed in the following steps.

First, the PDE 33 analyzes the positioning information of the MS 10 received from the MPC 32, using the DB 34 for storing therein position information of the plurality of BTSs belonging to the mobile communication network and the PN code information of the plurality of BTSs, etc.

Next, the PDE 33 calculates, using the triangulation method known in the art, latitude and longitude values corresponding to a cross point of nonlinear hyperbolas due to a distance difference between the MS 10 and three or more than neighboring BTSs in order to receive the present positioning information of the MS 10, thereby transmitting the calculated positioning information (that is, the latitude and longitude values) to the MPC 32.

After that, the MPC 32 transmits the received positioning information to the LSC 31 requesting the present positioning information of the MS 10. Accordingly, the LSC 31 allows a service requester to be served based on the present positioning information of the MS 10.

Meanwhile, in case the MS 10 receives the positioning information via the repeater installed in a shade area such as in a building or a subway, etc., comparing with the case of the repeater not being installed, since a relative propagation delay time difference occurs between the plurality of the BTSs based on the PN code, the conventional mobile station positioning system 30 has a drawback of generating the positioning errors when the PDE 33 performs positioning of the MS 10.

FIG. 2 illustrating a conventional state in which the MS receives the positioning information in case the repeater is not installed in the mobile communication network.

For example, referring to FIG. 2, the MS (S4) is at a distance (R0) from the BTS (a reference BTS) (S1) of the cell which the MS (S4) belongs to, being at the distance (R1) from a neighboring BTS (S2), and being at the distance (R2) from another neighboring BTS (S3). Further, the repeater is not installed between the MS (S4) and the respective BTSs (S1, S2 and S3).

Accordingly, in this case excepting a fading effect, etc., when the BTS (S1) is the reference BTS, the MS (S4) receives the positioning information delayed for a time proportional to the distance R1–R0 from the neighboring BTS (S2), and receives the positioning information delayed for a time proportional to the distance R2–R0 from another neighboring BTS (S3).

Actually, referring to FIG. 3, the PN codes received from the BTSs (S1, S2, S3) to the MS (S4) represent the reception sensitivity (Ec/Io) over a predetermined level, and more particularly, having a time at which the MS (S4) receives the PN code (PN6) of the reference BTS (S1) as a reference time, the PN code (PN12) of the BTS (S2) is delayed for a $t^0$ time and received, and the PN code (PN100) of the BTS (S3) is delayed for a $t^1$ time and received.

FIG. 4 illustrates a conventional state in which the MS receives the positioning information in case the repeater is installed in the mobile communication network.

In the meanwhile, referring to FIG. 4, the MS (S4) is at the distance (R0) from the BTS (the reference BTS) (S1) belonging to the cell of the MS (S4), being at the distance (R1) from a neighboring BTS (S2), and being at the distance (R2) from another neighboring BTS (S3). Further, the repeater is not installed between the MS (S4) and the respective BTSs (S1 and S2), but the repeater (RP1) is installed between the MS (S4) and the BTS (S3).

Accordingly, in this case, when the BTS (S1) is the reference BTS, the MS (S4) receives the positioning information delayed for the time proportional to the distance R1–R0 from the neighboring BTS (S2), and receives the positioning information delayed for the time proportional to the distance R2–R0 from another neighboring BTS (S3) and a delayed time due to the repeater itself (RP1).

Actually, referring to FIG. 5, the PN codes received from the BTSs (S1, S2, S3) to the MS (S4) represent the reception sensitivity (Ec/Io) over the predetermined level, and more particularly, having the time at which the MS (S4) receives the PN code (PN6) of the reference BTS (S1) as the reference time, the PN code (PN12) is delayed for the $t^0$ time and received from the BTS (S2), but the PN code (PN100) is delayed for the $t^2$ time and received from the BTS (S3).

That is, the PN code (PN100) is longer delayed for the delayed time ($t^2-t^1$) due to the repeater (RP1) and received from the BTS (S3) to the MS (S4), comparing with the repeater (RP1) not being installed.

Therefore, even though the distance between the MS (S4) and the BTS (S3) is actually R2, in case the PDE 33 performs the positioning for the MS (S4) so as to calculate the distance between the MS (S4) and the BTS (S3), a distance error is generated as much as the distance $(t^2-t^1)*C$ (C indicates a velocity of light) corresponding to the delayed time ($t^2-t^1$) due to the repeater (RP1).

The conventional mobile station positioning system has a disadvantage in which the distance error causes the positioning error to occur when the PDE 33 performs the present positioning for the MS (S4) on basis of the positioning information of the MS (S4) received from the MPC 32.

SUMMARY OF THE INVENTION

Accordingly, the present invention is directed to a method for correcting positioning errors of a mobile station positioning system in a CDMA communication system that substantially obviates one or more problems due to limitations and disadvantages of the related art.

An object of the present invention is to provide a method for correcting positioning errors of a mobile station positioning system in a CDMA communication system, in which a present position of a mobile station can be exactly searched without any influence of the delayed time due to the repeater Another object of the present invention is to provide a method for correcting positioning errors of a mobile station positioning system in a CDMA communication system, in which it can be allowed to acknowledge that a present position of a mobile station is searched in an arbitrary floor in case a PN code of a base station transceiver subsystem is received in a mobile station via a repeater installed in the high-storied building.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, the method includes the steps of: delaying a PN code transmitted to a mobile station (MS) from a specific base station transceiver subsystem (BTS) via a repeater, for a +64Chip period or a +64Chip+nChip period in a +64Chip delay element or a +64Chip+nChip delay element; combining the PN code transmitted to the MS from the specific BTS via the repeater with a PN code created by delaying the PN code transmitted to the MS from the specific BTS via the repeater for the +64Chip period or the +64Chip+nChip period in a combiner, thereby transmitting the combined PN code to the MS; receiving the PN code of the specific BTS and the PN code created by delaying the PN code of the specific BTS for the +64Chip period or the +64Chip+nChip period and transmitting the received PN codes to the mobile station positioning system via a mobile communication network, in the MS; analyzing the PN codes received in the MS via a mobile positioning center (MPC) to determine whether the PN code of the specific BTS is transmitted to the MS via the repeater, in a position determination entity (PDE) of the mobile station positioning system; and if it is determined that the PN code of the specific BTS is transmitted to the MS via the repeater, subtracting a delayed time due to a corresponding repeater itself previously stored in a database (DB) from a time at which the PN code of the specific BTS is received in the MS via the repeater, to calculate a distance between the specific BTS and the MS in the PDE.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Figure 6:
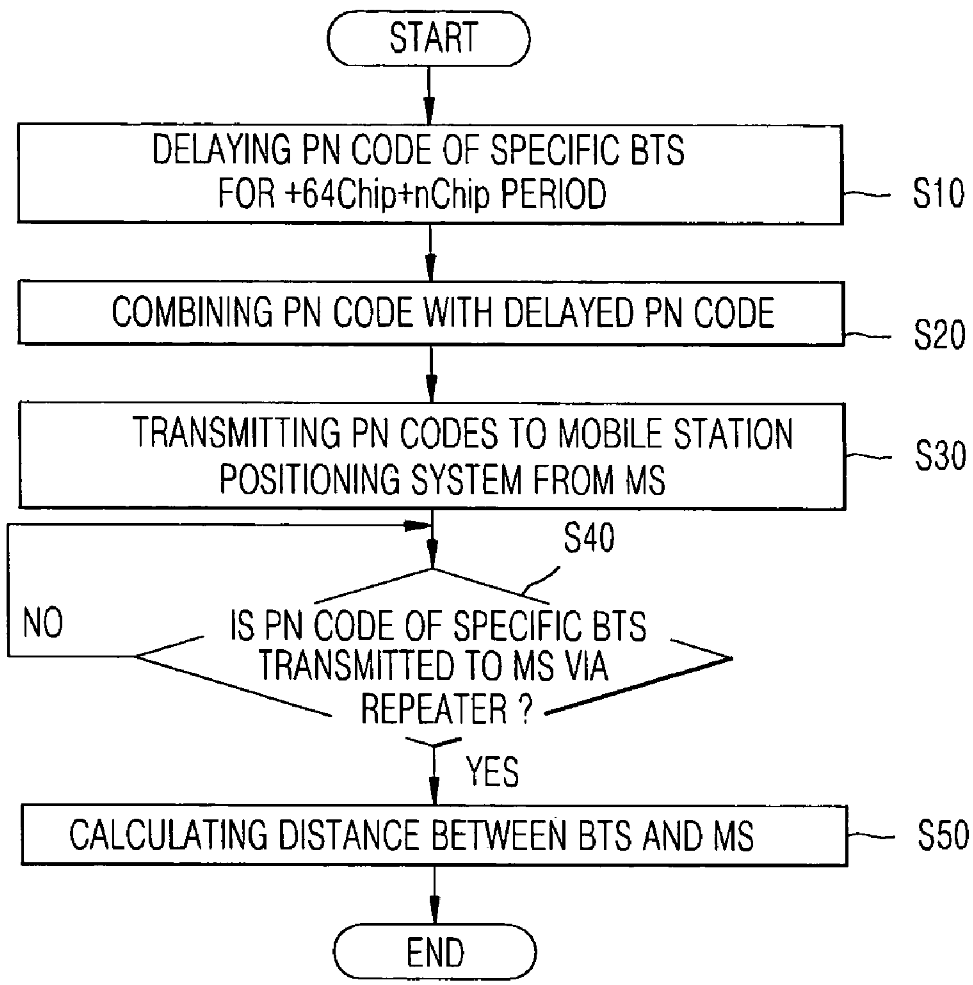
FIG. 6 is a flow chart of illustrating a method for correcting positioning errors of a mobile station positioning system in a CDMA communication system according to a preferred embodiment of the present invention.

FIG. 6 is a flow chart of illustrating a method for correcting positioning errors of a mobile station positioning system in a Code Division Multiple Access (CDMA) communication system according to a preferred embodiment of the present invention.

Figure 7:
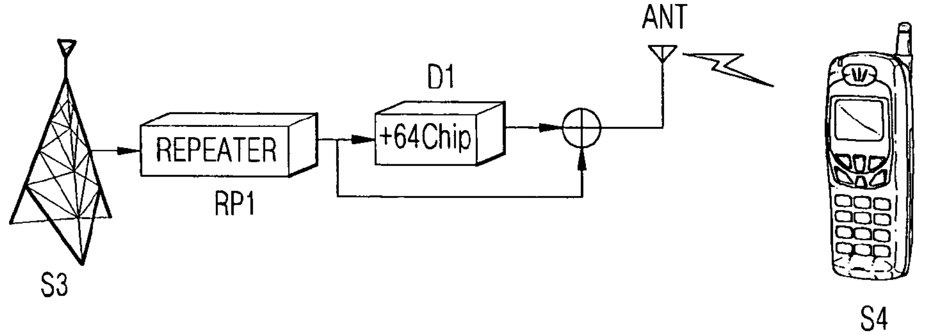
FIG. 7 illustrates a construction of a mobile communication network including a +64Chip delay element for distinguishing a PN code of a base station transceiver subsystem transmitted to a mobile station via a repeater according to a preferred embodiment of the present invention.
Figure 8:
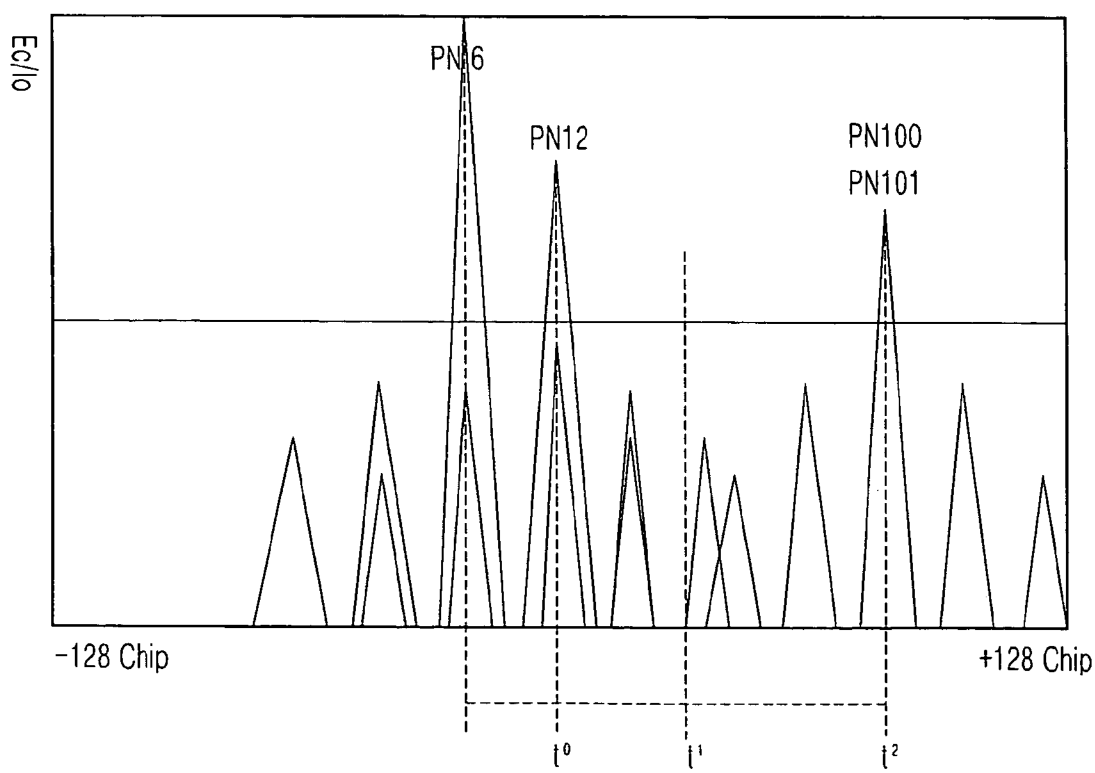
FIG. 8 is a graph of illustrating a delayed time of a PN code received in a mobile station according to a construction of FIG. 7.

FIG. 7 illustrates a construction of the mobile communication network including a +64Chip delay element for distinguishing a PN code of a base station transceiver subsystem (BTS) transmitted to a mobile station (MS) via the repeater according to a preferred embodiment of the present invention. FIG. 8 is a graph of illustrating a delayed time of the PN code received in the MS according to the construction of FIG. 7.

Figure 9:
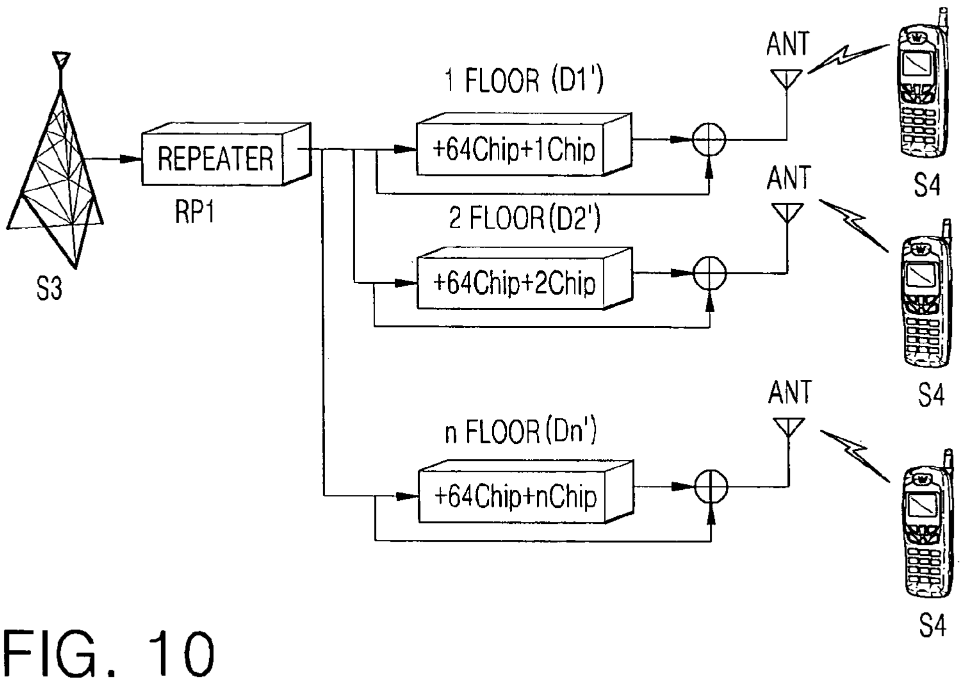
FIG. 9 illustrates a construction of a mobile communication network including a +64Chip+nChip delay element for distinguishing a PN code of a base station transceiver subsystem transmitted to a mobile station positioned in a building, via a repeater according to a preferred embodiment of the present invention.
Figure 10:
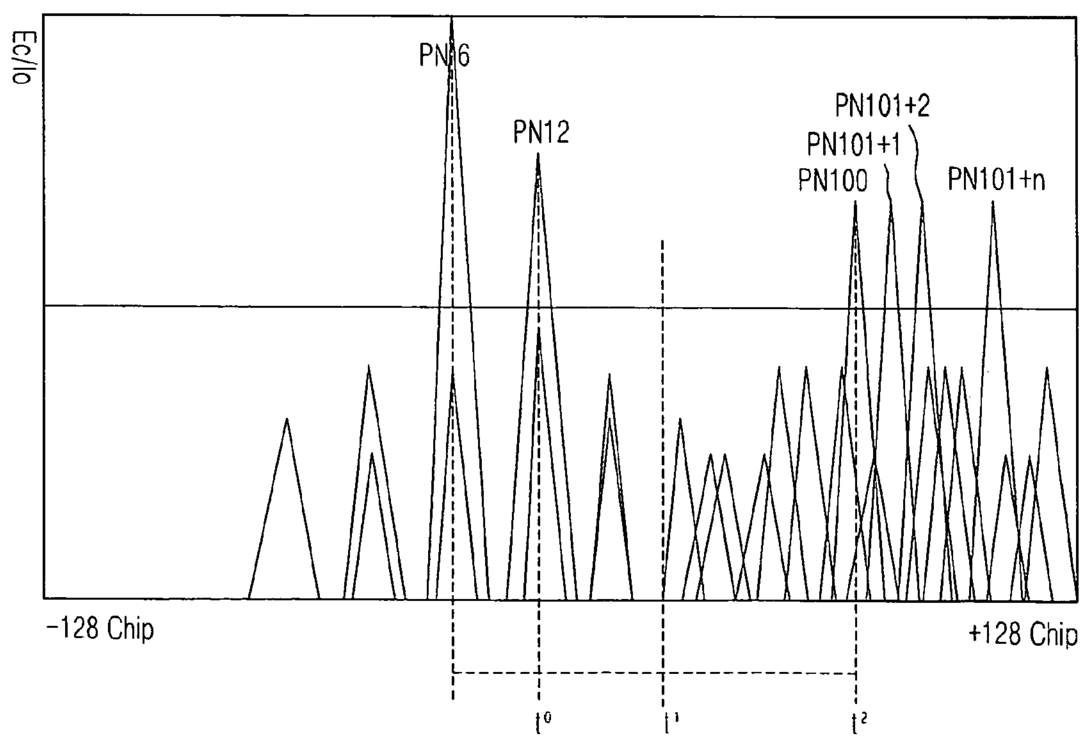
FIG. 10 is a graph of illustrating a delayed time of a PN code received in a mobile station according to a construction of FIG. 9.

FIG. 9 illustrates a construction of the mobile communication network including a +64Chip+nChip delay element for distinguishing the PN code of the BTS transmitted to the MS positioned in the building via the repeater. FIG. 10 is a graph of illustrating the delayed time of the PN code received in the MS according to the construction of FIG. 9.

Referring to FIG. 6, the PN code is received from a specific BTS included in the mobile communication network 20 communicating with a mobile station positioning system 30. If the received PN code is transmitted to the MS via the repeater, the PN code of the specific BTS is delayed for a +64Chip period in the +64Chip delay element or is delayed for a +64Chip+nChip period in the +64Chip+nChip delay element (S10).

After that, the transmitted PN code is combined with the delayed PN code in a combiner connected to an output terminal of the repeater, thereby transmitting the combined PN codes to the MS via an antenna (S20).

Next, the PN codes of corresponding BTSs received from other BTSs for positioning the MS as well as the combined PN code are received from the MS and transmitted to the mobile station positioning system 30 via the mobile communication network 20 (S30).

Here, as described above, the reason of delaying, for the +64Chip period, the PN code received from the specific BTS to the MS via the repeater is as follows.

That is because it can be allowed to acknowledge that the PN codes are transmitted to the MS from the specific BTS via the repeater, from the fact that since the PN code is delayed for the +64Chip period to distinguish a plurality of BTSs from one another in a general CDMA mobile communication network and a PN code increment uses an even number of 2 or 4, etc., an odd numbered PN code delayed for the +64Chip period is transmitted together with an even numbered PN code of the specific BTS to the MS.

For example, as shown in FIG. 7, when the PN code (PN100) is transmitted from the BTS (S3) to the MS (S4), if the PN code (PN100) is delayed for the +64Chip period in the +64Chip delay element (D1) via the repeater (RP1), the odd numbered PN code (PN101) is created. After that, the PN codes (PN100) (PN101) are combined with each other in the combiner (⊕), thereby being transmitted to the MS via the antenna (ANT)

Accordingly, as shown in FIG. 8, the MS (S4) receives the PN codes (PN100) (PN101) delayed for the delayed time of the repeater itself (RP1), at the $t^2$ time.

Further, as described above, the reason of delaying, for the +64Chip+nChip period, the PN code received from the specific BTS to the MS via the repeater is as follows.

That is because it can be allowed to acknowledge that the PN codes are transmitted to the MS positioned in the nth floor of a high-storied building, from the specific BTS via the repeater.

For example, as shown in FIG. 9, when the PN code (PN100) is received from the BTS (S3) and transmitted to the MS (S4) positioned in the first floor of the high-storied building, if the PN code (PN100) is delayed for the +64Chip+1Chip period in the +64Chip+1Chip delay element (D1') via the repeater (RP1), the PN code (PN101+1Chip) is delayed for the +1Chip period and created. After that, the PN codes (PN100)(PN101+1Chip) are combined with each other in the combiner (⊕), thereby being transmitted to the MS via the antenna (ANT).

Accordingly, as shown in FIG. 10, the MS (S4) receives the PN code (PN100) delayed for the delayed time of the repeater itself (RP1) at the $t^2$ time, and then receives the PN code (PN101+1Chip) at the time delayed for the +1chip period.

Referring again to FIG. 9, also even when the PN code (PN100) is received from the BTS (S3) and transmitted to the MS (S4) positioned in the second or nth floor of the high-storied building, if the PN code (PN100) is delayed for a +64Chip+2Chip period or a +64Chip+nChip period in a +64Chip+2Chip delay element (D2') or a +64Chip+nChip delay element (Dn') via the repeater (RP1), the PN code (PN101+2Chip) or the PN code (PN101+nChip) is delayed for the +2Chip period or the +nChip period and created. After that, the PN code (PN100) and the PN code (PN101+2Chip) or (PN101+nChip) are combined with each other in the combiner (⊕), thereby being transmitted to the MS via the antenna (ANT).

Accordingly, as shown in FIG. 10, the MS (S4) receives the PN code (PN100) delayed for the delayed time of the repeater itself (RP1) at the $t^2$ time, and then receives the PN code (PN101+2Chip) or the PN code (PN101+nChip) at the time delayed for the +2Chip period or the +nchip period.

As mentioned above, if the PN codes received via the repeater and the PN codes of the corresponding BTSs received from other BTSs for positioning of the MS are transmitted to the mobile station positioning system from the MS via the mobile communication network, the PDE of the mobile positioning system uses the positioning information including the PN codes to calculate the present positioning information (that is, the latitude and longitude values) of the MS in the manner as known in the art.

Herein, the positioning information includes, for example, the reception sensitivity (Ec/Io), the relative propagation delay time between the plurality of BTSs based on the PN code, the system identification code (SID), the switching identification code (NID), the BTS identification code (BID), etc.

Next, in case the PDE uses the positioning information including the PN code to calculate the present positioning information of the MS, and more particularly, in case the PDE uses the relative propagation delay time value between the plurality of the BTSs based on the PN code to calculate the distance between the BTSs and the MS, if the PN codes received via the repeater and the PN codes of the corresponding BTSs received from other BTSs for positioning of the MS are transmitted to the mobile station positioning system from the MS via the mobile communication network according to the present invention for correcting the positioning errors generated due to the delayed time of the repeater itself installed between the BTS and the MS, the PN codes received in the MS through the MPC are analyzed to determine whether the PN code of the specific BTS is transmitted to the MS via the repeater (S40).

Figure 1:
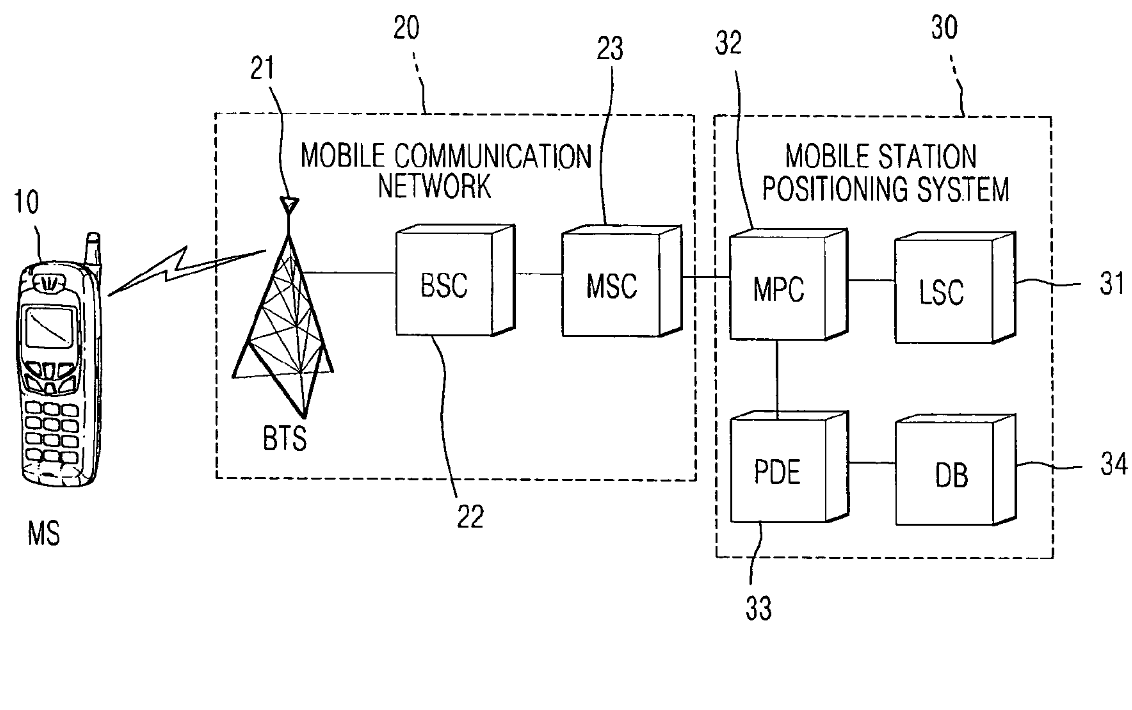
FIG. 1 illustrates a construction of a conventional mobile station positioning system.
Figure 2:
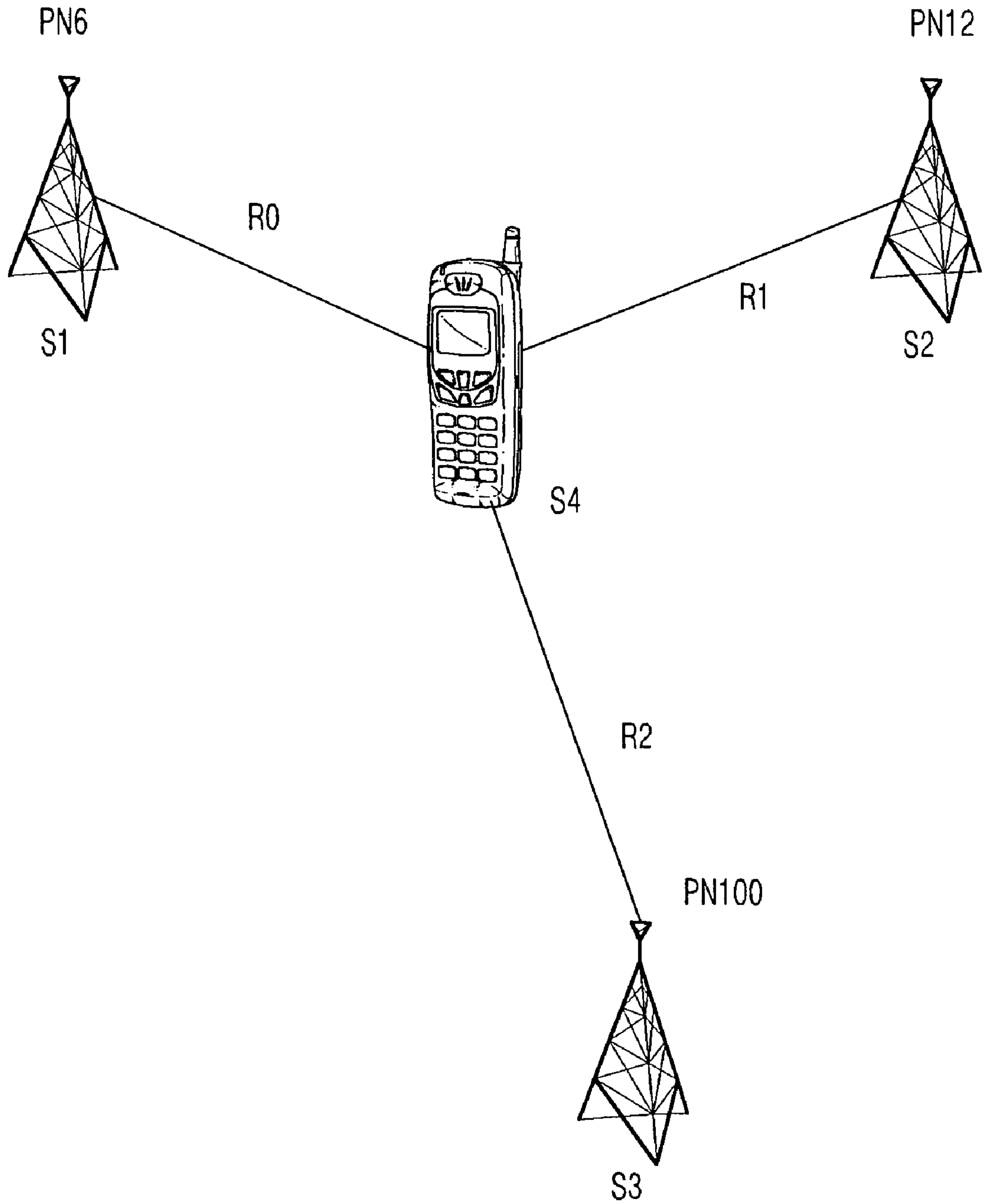
FIG. 2 illustrates a conventional state in which a mobile station receives positioning information in case a repeater is not installed in a mobile communication network.
Figure 3:
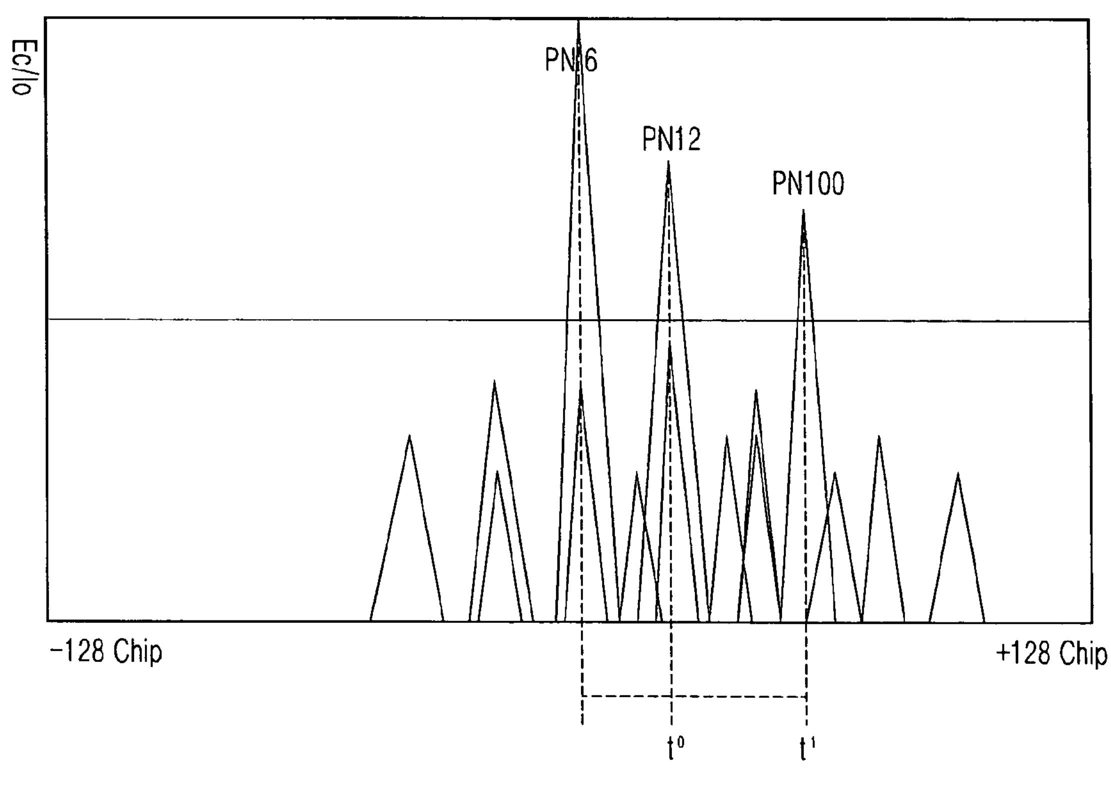
FIGS. 3 is a graph of illustrating a delay time of a Pseudo random Noise (PN) code received in a mobile station of FIG. 2.
Figure 4:
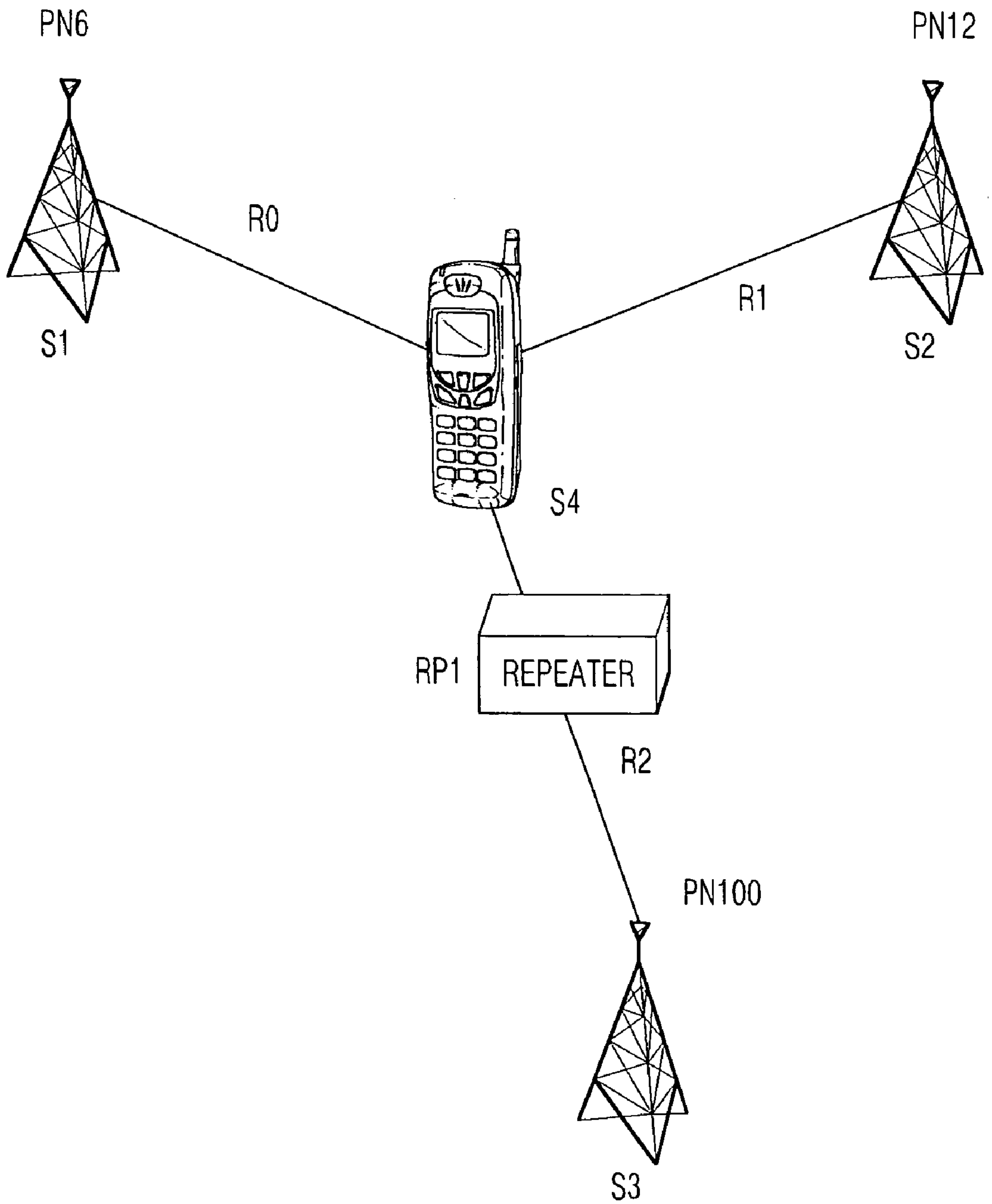
FIG. 4 illustrates a conventional state in which a mobile station receives positioning information in case a repeater is installed in a mobile communication network.
Figure 5:
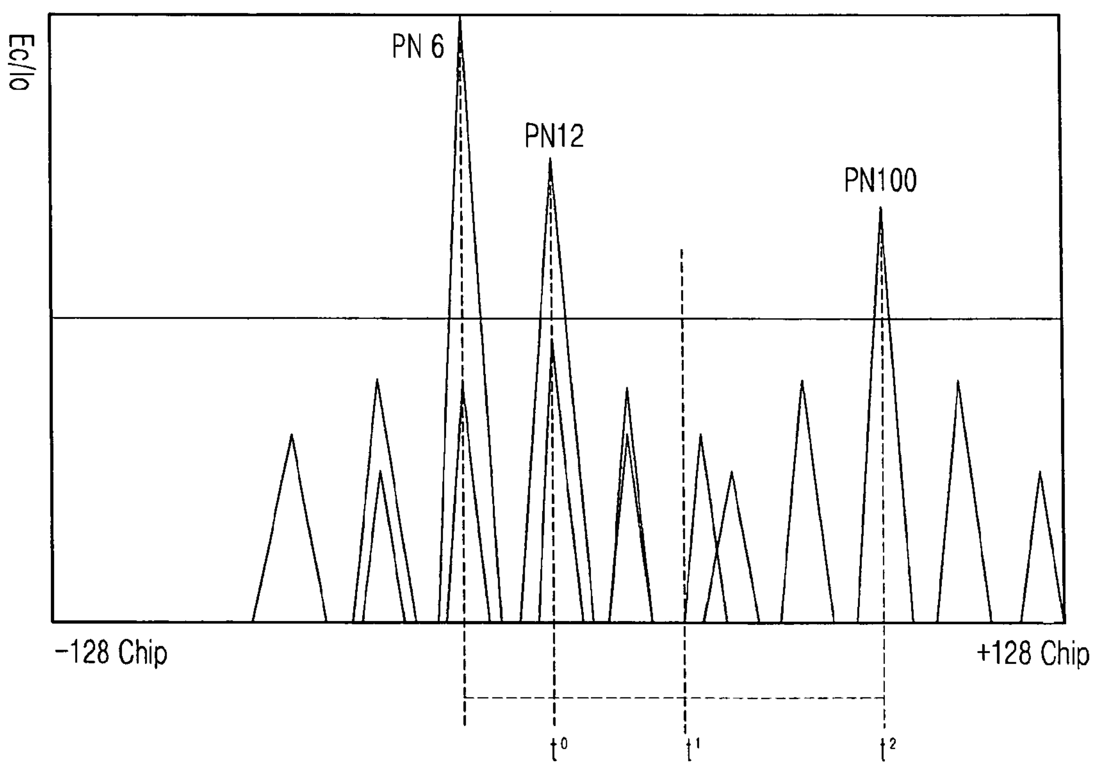
FIG. 5 is a graph of illustrating a delayed time of a Pseudo random Noise (PN) code received in a mobile station of FIG. 4.

For example, referring to FIG. 8, the PN code (PN100) of the BTS (S4) is delayed for the delayed time ($t^2-t^1$) of the repeater itself (RP1) in case the repeater (RP1) is installed rather than the case not being installed (shown in FIG. 3). At this time, since the PN code (PN101) delayed for the +64Chip period in the +64Chip delay element (D1) according to the present invention is received together with the PN code (PN100) in the MS, the PDE can be allowed to acknowledge that the repeater (RP1) is installed between the BTS (S3) and the MS (S4).

Further, referring to FIG. 10, the PN code (PN100) of the BTS (S4) is delayed for the delayed time ($t^2-t^1$) of the repeater itself (RP1) in case the repeater (RP1) is installed rather than the case not being installed (shown in FIG. 3).

At this time, if the PN code (PN100) is delayed for the +64Chip+1Chip period, the +64Chip+2Chip period, or the +64Chip+nChip period in the +64Chip+1Chip delay element (D1'), the +64Chip+2Chip delay element (D2') or the +64Chip+nChip delay element (Dn') according to the present invention, since the PN code (PN101+1Chip), (PN101+2Chip) or (PN101+nChip) is delayed for the +1Chip period, the +2Chip period or the +nChip period and received after the PN code (PN100) is received in the MS, the PDE can be allowed to acknowledge that the repeater (RP1) is installed between the BTS (S3) and the MS (S4) positioned in the first, the second or nth floor of the high-storied building.

If it is determined that the PN code of the specific BTS is transmitted to the MS via the repeater, the PDE subtracts the delayed time due to the corresponding repeater itself previously stored in the DB from the time at which the PN code of the specific BTS is received in the MS via the repeater, thereby calculating the distance between the specific BTS and the MS (S50).

At this time, if the delayed PN code created by delaying the PN code of the specific BTS for the +64Chip period is received in the MS among the PN codes at the same time as the PN code of the specific BTS, the PDE subtracts the delayed time due to the corresponding repeater itself previously stored in the DB from the time at which the PN code of the specific BTS is received in the MS via the repeater, to calculate the distance between the specific BTS and the MS.

For example, as shown in FIG. 8, in case the PN code (PN100) of the BTS (S3) and the delayed PN code (PN101) created by delaying the PN code (PN100) of the BTS (S3) for the +64Chip period are received at the $t^2$ time, the PDE subtracts the delayed time ($t^2-t^1$) of the corresponding repeater itself previously stored in the DB from the time $t^2$ at which the PN code (PN100) of the BTS (S3) is received in the MS via the repeater, to calculate the substantial distance (referring to FIG. 3, light velocity=$C^*t^1$) between the BTS (S3) and the MS.

Further, if the delayed PN code created by delaying the PN code of the specific BTS for the +64Chip+nChip period is received in the MS later than the PN code of the specific BTS as long as the +nChip period, the PDE subtracts the delayed time due to the corresponding repeater itself previously stored in the DB from the time at which the PN code of the specific BTS is received in the MS via the repeater, to calculate the distance between the specific BTS and the MS positioned in the nth floor of the high-storied building.

For example, as shown in FIG. 10, in case the PN code (PN100) of the BTS (S3) and the PN code (PN101+nChip) created by delaying the PN code of the BTS (S3) for the +64Chip+nChip period are received later than the $t^2$ time as long as the +nChip period, the PDE subtracts the delayed time ($t^2-t^1$) of the corresponding repeater itself previously stored in the DB from the time $t^2$ at which the PN code (PN100) of the BTS (S3) is received in the MS via the repeater, to calculate the substantial distance (light velocity=$C^*t^1$in FIG. 3) between the BTS (S3) and the MS positioned in the nth floor.

As described above, it is determined whether the PN code of the BTS among information used for positioning the MS is transmitted to the MS via the repeater installed in the building or the subway, etc., and if it is determined that the PN code is transmitted to the MS via the repeater, the positioning errors are corrected by subtracting the delayed time due to the repeater from the time at which the PN code of the BTS is received in the MS via the repeater.

Accordingly, the correction method of the positioning errors according to the present invention has an advantage in which the present position of the MS can be exactly searched without any influence of the delayed time due to the repeater, and more particularly, in which it can be allowed to acknowledge that the present position of the MS is searched in an arbitrary floor in case the PN code of the BTS is received in the MS via the repeater installed in the high-storied building.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A method for correcting positioning errors of a mobile station positioning system in a Code Divisional Multiple Access communication system, the method comprises the steps of:

delaying a PN code transmitted to a mobile station from a base station transceiver subsystem via a repeater, for a +64Chip period or a +64Chip+nChip period in a +64Chip delay element or a +64Chip+nChip delay element;

combining the PN code transmitted to the mobile station from the base station transceiver subsystem via the repeater with a PN code created by delaying the PN code transmitted to the mobile station from the base station transceiver subsystem via the repeater for the +64Chip period or the +64Chip+nChip period in a combiner, thereby transmitting the combined PN code to the mobile station;

receiving the PN code of the base station transceiver subsystem and the PN code created by delaying the PN code of the base station transceiver subsystem for the +64Chip period or the +64Chip+nChip period and transmitting the received PN codes to the mobile station positioning system via a mobile communication network, in the mobile station;

analyzing the PN codes received in the mobile system via a mobile positioning center to determine whether the PN code of the base station transceiver subsystem is transmitted to the mobile station via the repeater, in a position determination entity of the mobile station positioning system; and if it is determined that the PN code of the base station transceiver subsystem is transmitted to the mobile station via the repeater, subtracting a delayed time due to a corresponding repeater previously stored in a database from a time at which the PN code of the base station transceiver subsystem is received in the mobile station via the repeater, to calculate a distance between the base station transceiver subsystem and the mobile station in the position determination entity.

2. The method of claim 1, wherein:

in the step of determining whether the PN code of the base station transceiver subsystem is transmitted to the mobile station via the repeater, if the PN code created by delaying the PN code of the base station transceiver subsystem for the +64Chip period or the +64Chip+nchip period is one of the PN codes received in the mobile system determining that the PN code of the base station transceiver subsystem is transmitted to the mobile station via the repeater.

3. The method of claim 2, wherein:

in the step of calculating the distance between the base station transceiver subsystem and the mobile station, if the PN code created by delaying the PN code of the base station transceiver subsystem for the +64Chip period among the PN codes received in the mobile station is received at a same time as the PN code of the base station transceiver subsystem, delayed time due to a corresponding repeater previously stored in the DB is subtracted in the portion determination entity from a time at which the PN code of the base station transceiver subsystem is received in the mobile station via the repeater, to calculate a distance between the base station transceiver subsystem and the mobile station.

4. The method of claim 2, wherein in the step of calculating the distance between the base station transceiver subsystem and the mobile station, if the PN code created by delaying the PN code of the base station transceiver subsystem for the +64Chip+nchip period among the PN codes received in the mobile station is received later than the PN code of the base station transceiver subsystem as long as the +nchip period, the delayed time due to the corresponding repeater itself previously stored in the database is subtracted in the portion determination entity from time at which the PN code of the base station transceiver subsystem is received in the mobile station via the repeater, to calculate a distance between the base station transceiver subsystem and the mobile station mobile station positioned in the floor of a building.

5. The method of claim 1, wherein:

in the step of calculating the distance between the base station transceiver subsystem and the mobile station, if the PN code created by delaying the PN code of the base station transceiver subsystem for the +64Chip period among the PN codes received in the mobile station is received at a same time as the PN code of the base station transceiver subsystem, delayed time due to a corresponding repeater previously stored in the DB is subtracted in the portion determination entity from a time at which the PN code of the base station transceiver subsystem is received in the mobile station via the repeater, to calculate a distance between the base station transceiver subsystem and the mobile station.

6. The method of claim 1, wherein in the step of calculating the distance between the base station transceiver subsystem and the mobile station, if the PN code created by delaying the PN code of the base station transceiver subsystem for the +64Chip+nchip period among the PN codes received in the mobile station is received later than the PN code of the base station transceiver subsystem as long as the +nchip period, the delayed time due to the corresponding repeater itself previously stored in the database is subtracted in the portion determination entity from time at which the PN code of the base station transceiver subsystem is received in the mobile station via the repeater, to calculate a distance between the base station transceiver subsystem and the mobile station mobile station positioned in the floor of a building.

* * * * *